July 20, 1965
G. R. SIMPSON
3,196,366
DOUBLE END PUMPED OPTICAL MASER STRUCTURE
USING IMMERSION OPTICS
Filed Sept. 18, 1962
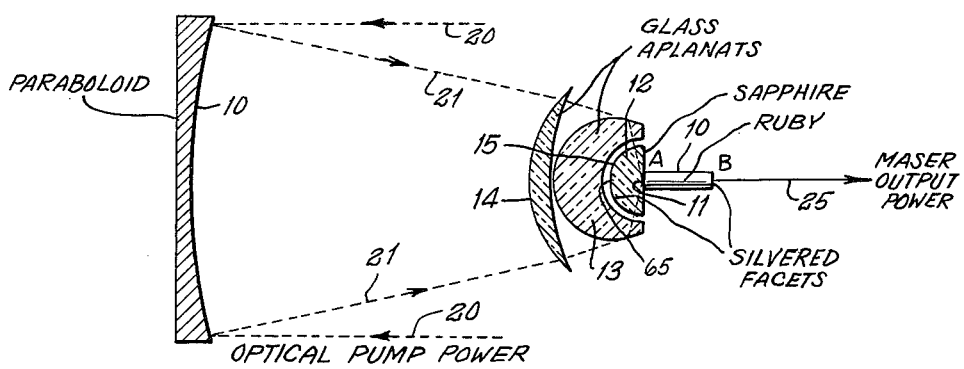
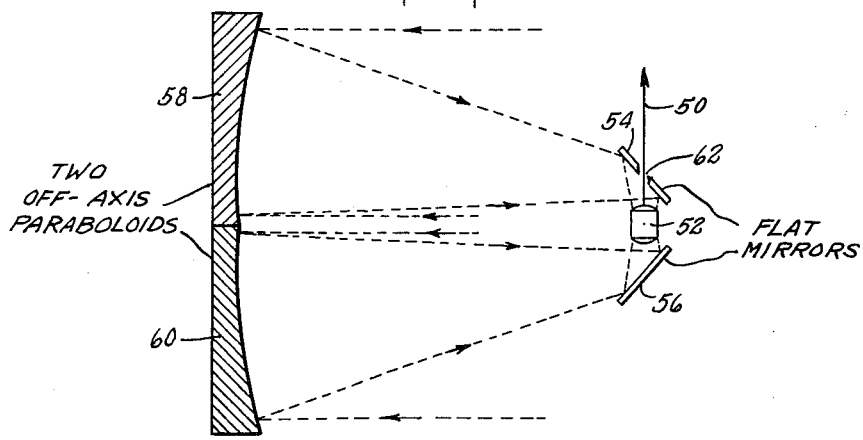
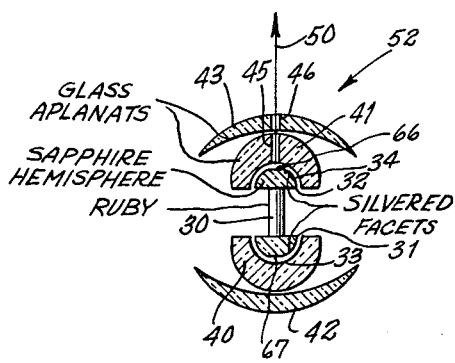
INVENTOR.
GEORGE R. SIMPSON
BY
ATTORNEY

United States Patent Office 3,196,366
Patented July 20, 1965

3,196,366
DOUBLE END PUMPED OPTICAL MASER STRUCTURE USING IMMERSION OPTICS
George R. Simpson, South Woodstock, Conn., assignor to American Optical Company, Southbridge, Mass., a voluntary association of Massachusetts
Filed Sept. 18, 1962, Ser. No. 224,409
6 Claims. (Cl. 331—94.5)

In a copending application Serial No. 170,138, filed January 31, 1962, for Laser Constructions and the Like, assigned to the assignee hereof, and of which I am a co-inventor, there is shown and described optical means for collecting radiant energy from a high intensity light source, such as the sun, and directing the energy so collected into a solid laser component, such as a ruby rod, at one end.

My present invention pertains to a laser construction in which a substantially increased amount of pump energy is absorbed per unit of volume of a solid laser, such as a ruby, over that resulting from the use of the previous invention above referred to.

Another object of my invention is to retain the advantages of the aforementioned previous invention and also either to operate successfully with a light source of lower intensity or to increase the output of light energy or laser emission over that previously possible.

Still another object of this invention is to produce comparable results with substantially the same source of intense light when using a solid laser of one-half the size and volume of that employed in the aforementioned previous invention.

The invention will be better understood by reference to the accompanying drawings, in which:

FIG. 1 is a diagrammatic view partially in section illustrating the principal elements of a laser construction having a solid laser and a single end pumping arrangement, such as that of the pending application Ser. No. 170,138, above referred to.

FIG. 2 is a diagrammatic side elevation of a laser construction embodying my present invention; and FIG. 3 is a partially sectional elevation of the construction of FIG. 2, but on a greatly enlarged scale to show the laser element and the related elements in detail.

Referring first to FIG. 1, a ruby rod 10 has one end A abutting in optical contact with a plano face 11 of a hemispherical sapphire 12, a glass aplanat 13 is adjacent to the sapphire 12, and its inner curvature is concentric therewith. Centered on the outer surface of the aplanat 13 and on the axis of the laser is a meniscus shaped glass aplanat 14, the inner face of which has a curvature of relatively large radius and is close to the outer surface of aplanat 13.

The outer curved surface 15 of sapphire 12 is flattened at a location 65 directly aligned with the ruby rod 10, and the area of this flattened part is such as to be substantially equal to the cross sectional area of the rod 10. This flattened part is silvered or otherwise coated so as to be highly reflective, while the other end B of the laser rod 10 is similarly silvered or coated, but so as to permit about a two percent transmission of light therethrough. Optical pump power is indicated by broken lines 20, and reflected beams 21 are refracted by the aplanat 14, and also again refracted by the aplanat 13, and thus strike the end A of the ruby rod 10.

In the arrangement of FIG. 1 the light incident upon the end of the ruby rod at A passes down the length of the ruby and is partially absorbed. The remainder is then incident upon the silvered facet B and is reflected back with further absorption taking place. The fraction of light absorbed is given by:

$$\frac{I_A}{I_0} = (1 - e^{-\alpha t})$$

where $I_A$=amount absorbed
$I_0$=amount incident
$\alpha$=absorption coefficient of the ruby
$t$=path length     (1)

For a ruby rod of length L, the amount absorbed for single end pumping is:

$$\left(\frac{I_A}{I_0}\right)_s = 1 - e^{-2\alpha L} \qquad (2)$$

For a specific example of ruby of length $L=1.0$ cm. and absorption coefficient $\alpha=0.6$ cm.$^{-1}$, $$\left(\frac{I_A}{I_0}\right)_s = .75 \qquad (3)$$

The laser is thus effectively pumped, and the laser output power is emitted along line 25, as indicated in the drawing.

Referring now to FIGS. 2 and 3, a solid laser rod 30, preferably of synthetic ruby, having a predetermined percentage of chromium doping, is interposed between two equal and opposite sapphire hemispheres 31 and 32. The ends of the laser 30 are in optical contact with the plano surfaces of the sapphire hemispheres, as clearly shown in FIG. 3, and the spherically curved surfaces 33 and 34 of the sapphires have flattened portions 66 and 67 corresponding to portion 65 of FIG. 1 and are silvered or otherwise made reflective, except that flattened portion 66 is adapted for two percent transmission.

The hyperhemispherical aplanats 40 and 41 are disposed adjacent to and in optical alignment with the sapphire hemispheres, and the inner surfaces of the aplanats 40 and 41 have substantially the same centers of curvature as the sapphire hemispheres.

Close to the outer curved surface of each of the aplanats 40 and 41 is a meniscus shaped aplanat, and these are designated 42 and 43.

All of the elements 30, 31 and 32, 40 and 41, and 42 and 43 are coaxial, and holes 45 and 46 are formed in aplanats 41 and 43 to provide a discharge passage for the laser emission which is indicated at 50.

The laster rod 30 and its associated sapphires and aplanats constitute an assembly 52, which is shown on a small scale in FIG.2 but on a larger scale in FIG. 3, and which assembly is disposed between angularly arranged plane mirrors 54 and 56 so as to receive pumping light from a pair of off-axis parabolic mirrors 58 and 60. Mirror 54 is also provided with a discharge passage 62 for the laser emission at 50.

The invention herein disclosed concerns increasing the amount of pump energy absorbed per unit volume of the lasser material by optically pumping both ends thereof, as compared to merely pumping one end as in the above mentioned earlier disclosure. Assume the ruby sample in the double end pumped scheme of FIGS. 2 and 3 is identical in length and doping to the single end pumped scheme of FIG. 1. If the same amount of solar power is collected by the collecting mirrors in both cases, it implies that each of the two collectors for FIGS. 2 and 3 is half the area of the single solar collector for FIG. 1. The mirror diameter for each large mirror of FIG. 2 is scaled down by the $\sqrt{2}$ as compared to the diameter of the mirror of the FIG. 1 scheme. Keeping the numerical aperture of the FIGS. 2 and 3 scheme identical to that of the FIG. 1 scheme, implies all dimensions of the scheme of FIGS. 2 and 3 (including image size of the sun and consequently ruby diameter) are scaled down by a factor of $\sqrt{2}$, except for the length and doping of the ruby. Consequently, the volume of the FIGS. 2 and 3 ruby is one-half that of the FIG. 1 ruby. The amount of pump energy absorbed by the FIGS. 2 and 3 ruby from one end is:

$$\left(\frac{I_A}{I_{0/2}}\right)_D = 1 - e^{-\alpha L} \qquad (4)$$

The amount absorbed from both ends is:

$$\left(\frac{I_A}{I_0}\right)_D = 2(1 - e^{-\alpha L}) \qquad (5)$$

For the same ruby constants as given earlier for the FIG. 1 case (i.e. $L=1$ cm., $\alpha=0.6$ cm.$^{-1}$), the absorption is:

$$\left(\frac{I_A}{I_0}\right)_D = .50$$

Thus, only ⅔ as much of the incident energy is absorbed by the FIGS. 2 and 3 ruby as by the FIG. 1 ruby. However, the volume of the FIGS. 2 and 3 ruby is half that of the FIG. 1 ruby. Thus the energy absorbed per unit volume of the FIGS. 2 and 3 ruby is 1.33 times that of the FIG. 1 ruby.

Therefore, it is evident that optical maser action will occur for the scheme of FIGS. 2 and 3 with a less intense source than for the FIG. 1 case.

I claim:

1. A laser structure comprising a cell composed of a solid laser rod, sapphire hemispheres mounted one at each end of the laser rod with its plano surface abutting and in optical contact with the adjacent end of the laser rod, and mirrors spaced from the respective ends of the cell and adapted to reflect light beams from a source of intense light to both ends of the laser rod.

2. A laser structure comprising a cell composed of a solid laser rod, sapphire hemispheres mounted one at each end of the laser rod with its plano surface abutting and in optical contact with the adjacent end of the laser rod, glass aplanats mounted one close to each sapphire hemisphere, and mirrors spaced from the respective ends of the cell and adapted to reflect light beams from a source of intense light to the aplanats whereby the aplanats transmit the reflected beams by refraction to both ends of the laser rod.

3. A laser structure comprising two off-axis paraboloids adapted to be subjected to intense light, an immersion cell at a distance from the paraboloids, said cell being composed of a solid laser rod, sapphire hemispheres mounted one at each end of the laser rod with its plano surface abutting and in optical contact with the adjacent end of the laser rod, aplanats mounted one close to each sapphire hemisphere and meniscus shaped glass aplanats mounted close to the outer surface of the adjacent aplanats, said aplanats at one end of the laser rod having holes coaxial with the laser rod whereby the laser beam may be freely emitted from one end of the laser rod through said holes, and mirrors spaced from the respective ends of the immersion cell and set to reflect the light beams from the off-axis paraboloids respectively to opposite ends of the immersion cell whereby the aplanats transmit the reflected beams by refraction to the ends of the laser rods.

4. A laser structure comprising two off-axis paraboloids adapted to be subjected to intense light, an immersion cell at a distance from the paraboloids, said cell being composed of a solid laser rod, sapphire hemispheres mounted one at each end of the laser rod with its plano surface abutting and in optical contact with the adjacent end of the laser rod, hyperhemispherical aplanats mounted one close to each sapphire hemisphere with its inner curved surface substantially parallel to the adjacent curved surface of the sapphire hemisphere, and meniscus shaped glass aplanats mounted close to the outer surface of the adjacent hyperhemispherical aplanats, said aplanats at one end of the laser rod having holes coaxial with the laser rod whereby the laser beam may be freely emitted from one end of the laser rod through said holes, and mirrors spaced from the respective ends of the immersion cell and set to reflect the light beams from the off-axis paraboloids respectively to opposite ends of the immersion cell whereby the aplanats transmit the reflected beams by refraction to the ends of the laser rod.

5. A laser structure comprising a cell composed of a solid laser rod, aplanatic lens means of high refractive index positioned adjacent each end of the laser rod and having a plano surface thereon abutting and in optical contact with the adjacent end of the laser rod, highly reflective coatings carried by each aplanatic lens means at locations spaced from each end of the laser rod, at least one of which coatings is slightly transmissive, and mirrors spaced from the respective ends of the cell and each adapted to reflect light beams from a source of intense light to the ends of the laser rod.

6. A laser structure comprising a cell composed of a solid laser rod, alplanatic lens means of high refractive index positioned adjacent each end of the laser rod and having a plano surface thereon abutting and in optical contact with the adjacent end of the laser rod, highly reflective coatings carried by each aplanatic lens means at locations spaced from each end of the laser rod, at least one of which coatings is slightly transmissive, and mirrors spaced from the respective ends of the cell and each adapted to reflect light beams from a source of intense light to the ends of the lasser rod, said aplanatic lens means at one end of the laser rod having holes coaxial with the laser rod whereby the laser beam may be freely emitted from one end of the laser rod through said holes.

References Cited by the Examiner

Bushor: "Sun and Exploding Wires Pump Lasers," Electronics, volume 35, No. 13, pages 24 and 25, March 30, 1962.

Nelson et al.: "A Continuously Operating Ruby Optical Maser," Applied Optics, volume 1, No. 2, March 1962, pages 181 to 183.

JEWEL H. PEDERSEN, *Primary Examiner.*